(12) United States Patent
Laurinavichus (10) Patent No.: US 7,260,191 B1
(45) Date of Patent: Aug. 21, 2007

(54) SYSTEM AND METHOD FOR INTERACTIVE VOICE RESPONSE CALL PROCESSING WITH EXTERNAL ROUTING AND APPLICATION FLOW CONTROL

(75) Inventor: Vladislav I. Laurinavichus, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 4 days.

(21) Appl. No.: 10/972,646

(22) Filed: Oct. 26, 2004

(51) Int. Cl.
*H04M 11/00* (2006.01)

(52) U.S. Cl. .................. 379/93.29; 379/258; 704/275; 709/203; 715/744

(58) Field of Classification Search ............. 379/93.29, 379/258; 704/275; 709/203; 715/744
See application file for complete search history.

(56) References Cited

U.S. PATENT DOCUMENTS

| | | | | |
|---|---|---|---|---|
| 4,510,351 | A * | 4/1985 | Costello et al. ........ | 379/265.01 |
| 5,572,583 | A * | 11/1996 | Wheeler et al. ....... | 379/221.09 |
| 5,978,577 | A * | 11/1999 | Rierden et al. ............... | 707/10 |
| 6,058,181 | A * | 5/2000 | Hebert ....................... | 379/242 |
| 6,154,527 | A * | 11/2000 | Porter et al. ............. | 379/88.18 |
| 6,301,703 | B1 * | 10/2001 | Shank et al. ................. | 717/109 |
| 6,327,363 | B1 * | 12/2001 | Henderson et al. .... | 379/265.01 |
| 6,335,964 | B1 * | 1/2002 | Bowater et al. ......... | 379/88.16 |
| 6,366,658 | B1 * | 4/2002 | Bjornberg et al. ..... | 379/221.08 |
| 6,879,685 | B1 * | 4/2005 | Peterson et al. ....... | 379/265.11 |
| 7,003,463 | B1 * | 2/2006 | Maes et al. .............. | 704/270.1 |
| 7,062,020 | B1 * | 6/2006 | Pirasteh et al. .......... | 379/88.18 |
| 2003/0088421 | A1 * | 5/2003 | Maes et al. .............. | 704/270.1 |
| 2003/0223566 | A1 * | 12/2003 | Book et al. ................. | 379/219 |
| 2004/0228469 | A1 * | 11/2004 | Andrews et al. ........ | 379/265.03 |
| 2005/0069102 | A1 * | 3/2005 | Chang ..................... | 379/88.18 |

\* cited by examiner

*Primary Examiner*—Fan Tsang
*Assistant Examiner*—Hemant Patel (57) ABSTRACT

A method and system are provided for processing an incoming call and providing an interactive voice response unit with application flow control and call arrival and departure control. The system includes a call router including rules for handling call arrival and call departure and an interactive voice response unit. The interactive voice response unit includes a state and event table for operation as a state machine for intermediate processing between call arrival and call departure. An additional external resource is provided for updating the state and event table in order to control interactive voice response application flow. The method includes processing call arrival at the call router, performing intermediate processing with the state machine at the interactive voice response unit, and handling call departure procedures at the call router. The method additionally includes updating the state and event tables and providing application flow control using an external resource.

28 Claims, 5 Drawing Sheets

| States (J) | Events (i) | | | | | | | | | |
|---|---|---|---|---|---|---|---|---|---|---|
| | 001 | 002 | 003 | 004 | 005 | 006 | 007 | 008 | 009 | 010 |
| 11 | 21 | 00 | 00 | 00 | 00 | 00 | 00 | 00 | 00 | 00 |
| 21 | 00 | 31 | 00 | 00 | 00 | 00 | 00 | 00 | 00 | 00 |
| 31 | 00 | 00 | 00 | 22 | 32 | 00 | 00 | 00 | 00 | 00 |
| 12 | 00 | 00 | 21 | 00 | 00 | 00 | 13 | 00 | 00 | 00 |
| 22 | 00 | 00 | 00 | 00 | 00 | 32 | 00 | 33 | 33 | 00 |
| 32 | 00 | 00 | 00 | 00 | 00 | 00 | 00 | 00 | 00 | 00 |
| 13 | 00 | 00 | 00 | 00 | 00 | 00 | 00 | 00 | 00 | 33 |
| 23 | 00 | 00 | 00 | 00 | 00 | 00 | 00 | 00 | 00 | 00 |
| 33 | 00 | 00 | 00 | 00 | 00 | 00 | 00 | 00 | 00 | 00 |

New state # = STD (event, Current state #)
e,g STD (002, 21) -> 31

SYSTEM AND METHOD FOR INTERACTIVE VOICE RESPONSE CALL PROCESSING WITH EXTERNAL ROUTING AND APPLICATION FLOW CONTROL

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to the field of telecommunications and more particularly to a system and method for distributing inbound calls and tracking process flow for handling of inbound calls.

BACKGROUND OF THE INVENTION

The demand for efficient and prompt customer support in various types of industries has created a need for enhanced call center efficiency. Many large industries rely on call centers to provide responsive customer support. Accordingly, common goals of these organizations include reduction of customer hold time, improved network utilization, and improved call processing flow.

Current call distribution systems currently rely heavily on interactive voice response (IVR) units and their applications to determine treatment received by incoming calls. Calls arrive at an IVR after having been processed by an automatic call distributor (ACD). Current IVR systems include an electronic work force (EWF) component in conjunction with a speech recognition engine and often run over one hundred different applications to process a customer's requests. The voice network assigns and ACD delivers identifying information such as a dialed number (DN) and dialed number identification service (DNIS) to each call. The identifying information includes objective information about the call. The ACD communicates the DN and/or other call data that indicate a call type to the IVR. Additional caller data associated with the caller placing the call, such as subscriber or account number may also be captured to assist in determining call treatment. For example, caller data may include call-entered data (CED) such as digits entered on a telephone touch-pad in response to voice prompts. Thus, a given call may be discriminated by call data such as a DN or caller number, as well as by caller data or a combination thereof.

Upon receiving the call type and/or other call information, the IVR searches an internally hard-coded dialed number identification service (DNIS) table or other stored rules within the IVR to identify an appropriate treatment for the incoming call and processes the call using a coded technique appropriate for the call type. If desired, the caller can request another service through the speech recognition engine to cause the call to follow an alternate path specified by stored rules within the IVR.

After transfer to a particular call center site is requested, the IVR uses coded routing logic stored within the IVR to define an IVR exit condition and a new call destination. The IVR represents the routing decision as a subtype and returns the subtype with the call to the destination ACD. The ACD removes the call from the IVR and continues call processing based on exit instructions for the subtype.

The process as described above can be unsatisfactorily slow and additionally requires IVR code modifications whenever treatment for a call type is changed. Accordingly a solution is needed that expedites request processing and optimizes IVR code while avoiding frequent IVR code modifications. Additionally, a solution is needed that allows tracking of call processing within an IVR application.

BRIEF SUMMARY OF THE INVENTION

Embodiments of the present invention are directed to a system for processing an incoming call. The system includes a call router including rules for handling call arrival and call departure and an interactive voice response unit. The interactive voice response unit includes a state and event table for operation as a state machine for intermediate processing between call arrival and call departure. The system may also include an external resource for updating the state and event table and controlling interactive voice response application flow.

In an additional aspect, a method is provided for processing an incoming call. The method includes initially treating a call with arrival procedures at a call router and processing the call using a state and event table in an interactive voice response unit. The method further includes performing call departure procedures at the call router upon receiving an exit condition from the interactive voice response unit. The method may additionally include initializing the state and event table with information contained in an external resource.

In yet a further aspect, an interactive voice response unit for processing a call after call arrival at a call router is provided. The interactive voice response unit includes a call routing interface for receiving information from the call router and a call event interface to notify call router about call state changes. The interactive voice response unit additionally includes a state and event table for processing the received information in order to determine a new state from a current event and a current state.

In yet an additional aspect, a method for intermediate processing of an incoming call at an interactive voice response unit is provided. The method is performed after call arrival at a call router and includes receiving call information from the call router at an interactive voice response unit call routing interface and call event interface and implementing a state and event table stored in the interactive voice response unit as a state machine to determine a new state based on a current state and a current event. The method may additionally include initializing the state and event table with information contained in an external resource.

BRIEF DESCRIPTION OF THE DRAWINGS

The present invention is described in detail below with reference to the attached drawings figures, wherein.

DETAILED DESCRIPTION OF THE INVENTION

A. System Overview

Embodiments of the invention provide IVR units with external call routing and application flow control. The provision of external logic for flow control allows alteration of IVR application flow for a specified call type without changing IVR application code. The provision of external logic further enables call arrival/departure control, call tracking and consolidated reporting for an external routing and/or reporting engine. As will be further explained below with regard to FIG. 2, external logic for an IVR unit 200 may be located within a call router 300 or within external tables 400 located in an alternative location. The provision of external logic facilitates a three-stage procedure in which the first stage, call arrival, and the final stage, call departure, are handled by the call router 300. The intermediate self-service processing phase is handled by the IVR unit 200 with updates provided by the external tables 400.

B. Operating Environment

Figure 1:
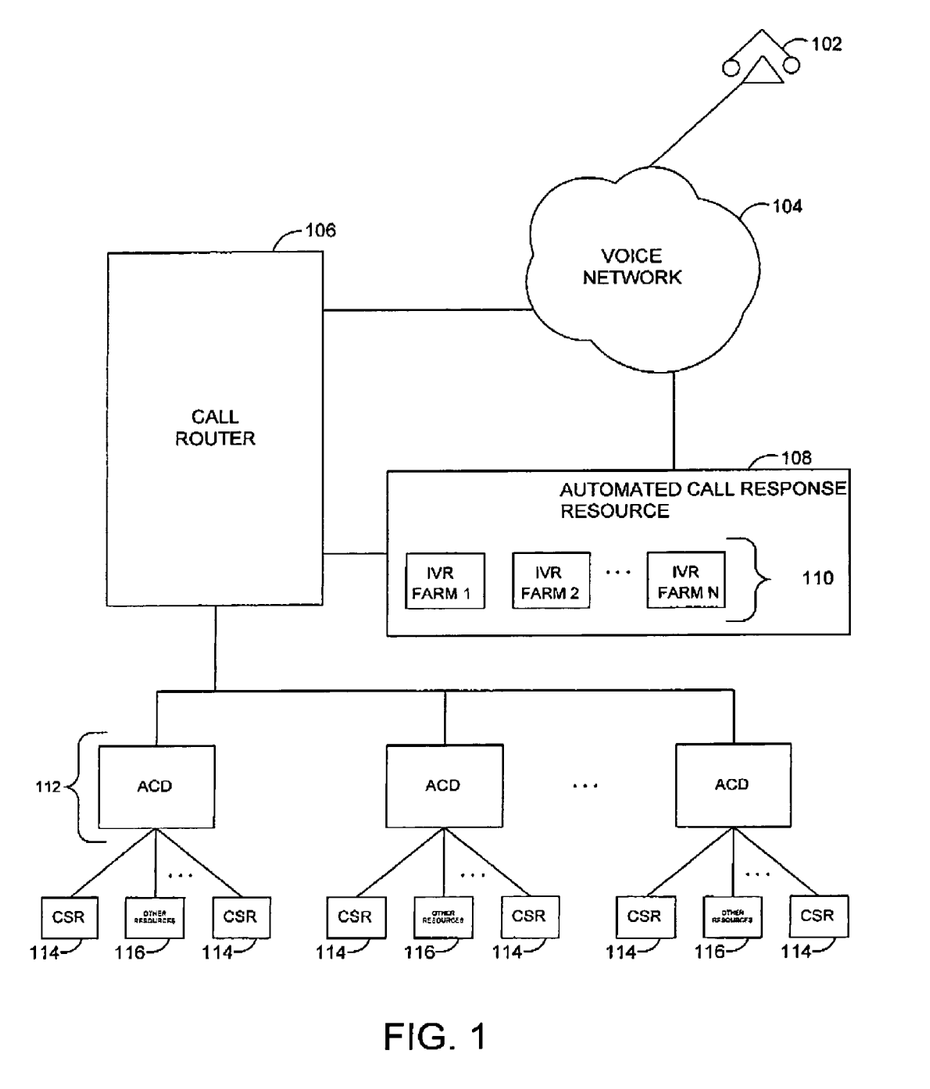
FIG. 1 is a block diagram illustrating an overview of a call routing environment in which embodiments of the invention may be implemented.

FIG. 1 illustrates an environment in which the system and method for call routing may be implemented in accordance with embodiments of the invention. The system and method of the invention may also be incorporated in alternative call distribution systems that include one or more ACD, IVR, and routing components.

In the environment illustrated in FIG. 1, a caller 102 may initiate a call via a voice network 104. The caller 102 may initiate the call in a variety of ways, for instance by initiating a cellular or other wireless call to a customer support number or by dialing an 800 number via a landline connection through the public switched telephone network (PSTN) or other link. The call may likewise be initiated via a voice over Internet Protocol (VoIP) call or connection or by establishing a voice call or hybrid voice/data call via other wired or wireless channels, links, or connections. The call may in embodiments be or include a direct-dialed, transferred, multi-party conference, or other call or connection.

Once the call is initiated, the incoming call may be communicated to a call router 106 that may be or include a server or other resource. The call router 106 may for instance be incorporated in an Advanced Intelligent Network (AIN) configuration or network, a Signaling System 7 (SS7) network or other communications network or fabric and may in embodiments include or interface to intelligent contact management (ICM) solution, other call routing solutions or other resource.

The call router 106 may host rules-based logic and other controls to be applied to the incoming call to analyze, route, and manage the call during its duration. In embodiments of the invention, the call router 106 may route the call directly to an automated call response resource 108 before additional call processing takes place. Thus, the call may be transmitted to the automated call response resource 108 before further call discrimination and selective routing to remote resources such as ACDs.

The automatic call response resource 108 may be, include, or interface to, for example, a set of interactive voice response farms 110. Each voice response farm may contain one or more interactive IVR units. The IVR units, which will be described in greater detail below, may include voice menus to prompt for keypad touch-tone, to capture voice responses for voice recognition processing, or to receive telephone typewriter (TTY) data, or to capture or process other input data from, via or related to caller 102 and the caller's inquiry.

The call may be distributed to one of the set of interactive voice response farms 110 based on load balancing criteria. The call router 106 may transfer the call to an available IVR farm, which, for example, has the greatest processor idle time, available bandwidth, or the largest number of open or momentarily unused ports. Other load balancing criteria may also be used. The automated call response resource 108 may periodically report utilization rates and other data to the call router 106 to permit load-balancing assignments to occur in accordance with existing conditions. Because the incoming call is directly transmitted to the set of interactive voice response farms 110 within the automated call response resource 108 based on fast decisioning criteria, the call may arrive at a voice response unit within an interactive voice response farm in a comparatively short time, which in cases may be approximately 250 milliseconds.

The caller 102 may thus be connected to an interactive voice response menu or other prompt or sequence in real time or near real time after initiating the call and reaching the voice network 104. The caller 102 may thus be engaged by interactive voice response processing algorithms of the set of interactive voice response farms 110. The caller 102 may be presented for example with a voice menu that supplies a prompt to enter keypad or touch tone data, voice response data, TTY data or other responses or data to capture details of the inquiry or other request. For example, the caller 102 may be prompted to speak or enter a telephone account number, a credit card account number, or other account, subscription or other number or identifier. The caller 102 may select a sequence of selections, prompts, notices, alerts, and other messages and responses while connected to the automated call response resource 108.

The data captured through completion of the initial interactive voice response interaction may be encapsulated in call information, an object that may be transmitted to the call router 106. Call information may include for example call data and caller data as well as other information. Call data may include data such as the DN, calling number data such as ten digit or other telephone number generated via automatic number identification (ANI) or other services, time of day or date of call origination, the carrier over which the call arrives or which bills or services the call, or other call parameters related to or identifying the originating call. Caller data may contain, for instance, caller entered data such as touch-tone, keypad, voice response, or other inputs in response to a voice prompt, TTY or other menu or interface. The data may include account, subscriber, user name, social security or other identifiers or data.

The call router 106 may receive the call information and evaluate or determine a call type or category based on the data. The call router 106 may host and execute rules-based logic or other algorithms that identify for example, a customer calling from his home telephone number who has correctly entered a product serial number for a product purchased less than twelve months ago may have a probable warranty or repair service call or inquiry. Other call types or categories may include cellular or other telephone or telecommunications account inquiries such as billing, subscription, service, cancellation, or other purposes. Other types of calls such as financial inquiries or transactions including telephone banking inquiries or brokerage trades, mail order transactions, hotel, airline, or other travel or other reservation, rebate or refund processing, locator services or other call categories, inquiries, or types are possible.

Based on the call information 114 and the processing performed by each IVR unit as will be further described below, the call router 106 may distribute any still pending, incomplete, or unsatisfied calls or inquiries to one of a further set of automatic call distributors 112. The set of automatic call distributors 112 may be or include local or remote call distribution trunks or exchanges, which for instance in embodiments may be located off-premises, which in cases may be on a related or on a separate network from the resources of the owner or operator of the automated call response resource 108. In embodiments, any one or more of the automatic call distributors within the set of automatic call distributors 112 may be dedicated or linked to specific customer support tasks or other resources. For example, one automatic call distributor may be dedicated to subscription or retention support and connect with resources tailored to those functions.

Those resources may include, for example, a group of customer service representatives (CSRs) 114 who may have expertise in account subscriptions and who may be supplied with application tools such as databases or data mining tools to resolve subscription, billing, service or other issues. Each of the automatic call distributors may likewise connect to other automated response resources 116 (e.g. auto attendant, music on hold, announcement systems) as appropriate, to generate further queries, inputs, or data access. The IVRs may be configured with menus or other interfaces to prompt the user for account subscription or other transactional information.

Figure 2:
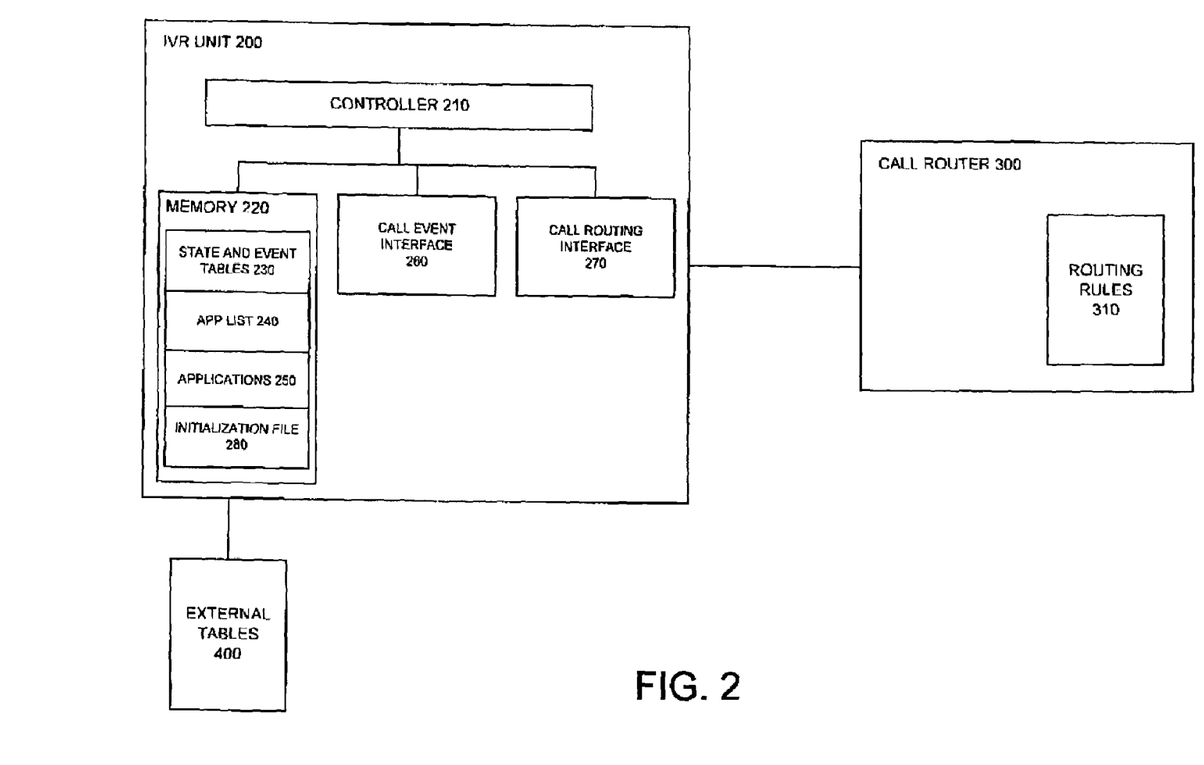
FIG. 2 is a block diagram illustrating a call processing system in accordance with an embodiment of the invention.

C. System and Method for IVR Call Processing with External Routing and Flow Control FIG. 2 illustrates details of a system and method in accordance with embodiments of the invention. An IVR unit 200, which may be located within an IVR farm 110 as described above with reference to FIG. 1, communicates with a call router 300 in accordance with embodiments of the invention. The IVR unit 200 also accesses external tables 400 containing information related to call processing. The IVR unit 200 and call router 300 shown include components that are relevant to the description of the invention. Additional components may also be included.

As set forth above, the IVR unit 200 may include voice menus to prompt for keypad touch-tone, to capture voice responses for voice recognition processing, or to receive telephone typewriter (TTY) data, or to capture or process other input data from, via or related to a caller and the caller's inquiry. In accordance with embodiments of the invention, the IVR unit 200 may include a controller 210, a memory 220, a call event interface 260, and a call routing interface 270. The memory 220 may store state and event tables 230, an application list 240, and applications 250. Other components may also be included.

The memory 220 may be a random access memory (RAM) suitable for storing data and applications. Other types of memory known in the art are also incorporated in the IVR unit 200.

The call event interface 260 and the call routing interface 270 enable communication with other system components in order to receive event and routing information from the call router 300. The call event interface 260 and the call routing interface 270 may be configured for each IVR unit 200 to simplify routing based on DN, ANI, MDN, or other call or caller information by the call router 300.

The state and event tables 230 are located in the IVR RAM 220 and are initialized by loading data from the external tables 400. The external tables 400 may be contained within an external database or other storage structure, but may not be contained within the IVR unit 200. The IVR unit 200 periodically checks an update key of the external tables 400 to determine if call flow information contained in the external tables 400 has changed. If changes have occurred, the IVR unit 200 re-initializes the state and event tables 230. Thus, the state and event tables 230 are updated based on data stored in the external tables 400 and are implemented as an IVR state machine during the intermediate self-service processing phase.

The IVR applications 250 include multiple building blocks. Each building block provides a specific function or feature. An application sequence for execution is defined by a current state as defined by the last function provided and current event based on caller real time and profile data as well as IVR assigned data. The application list 240 includes a reference for accessing each application 250. The IVR unit 200 preferably also includes an initialization file 280 that includes defaults, such as an emergency DN default and a default out-dialing combination.

In embodiments of the invention, the components of the IVR unit 200 may be contained within a development environment such as a Hi Cap Edify EWF (electronic work force) interconnected with a message delivery system (MDS) process through a TCP or IP connection. The Hi-Cap Edify EWF development environment allows creation of business applications and allows customers to access information over a telephone or Internet connection from existing back end systems. The components of the IVR unit 200 may additionally be contained within or connected with intelligent contact management (ICM) components or with other routing engine. The development environment may include an ICM object containing call information as described above. The IVR unit may also include or be connected with Genesys components such as Genesys libraries and network routing solutions.

The IVR unit 200 accesses the set of external tables 400 that may be stored in an external database or other storage structure. The external tables 400 may include information that dictates the course of call processing such a DNIS table and stored processing rules. Information contained within the external tables 400 may be more easily modified than information coded within the IVR UNIT 200. Furthermore, removal of this information from the IVR UNIT 200 may improve the processing speed of the IVR UNIT 200 and allow to change call arrival/departure procedures without IVR code modifications.

The call router 300 pre-routes inbound calls based on available call parameters such as DN, ANI, or mobile directory number (MDN) and call digits through the call routing interface 270 of each IVR unit 200. During the pre-routing or call arrival phase, the call router 300 will issue a call notification to the appropriate IVR unit 200. The call notification includes a correlation key such as an inbound DN for the impending call. The call notification may also include an application number. As set forth above, DNIS information is not stored in the IVR unit 200. The IVR unit 200 will accept and use any four digit DNIS in order to obtain data and instructions from the call router 300. The initialization file 280 of the IVR unit 200 may store emergency DNIS information. The emergency DNIS information stored in the IVR unit 200 may handle a call if the call router 300 fails and does not initially pre-route the call.

The call router 300 may include a set of routing rules 310. The routing rules 310 may include business rules based logic for defining call arrival and departure procedures to and from the IVR unit 200. Upon call arrival, the call router 300 handles initial call treatment. The call router may pre-route inbound calls based on available call parameters as set forth above. During the pre-routing phase, the call router 300 may issue a call notification to the IVR. If the call reaches an exit state in the state and event tables 230 of the IVR unit 200, the call router 300 may initiate the exit route request from the IVR unit 200.

Figure 3:
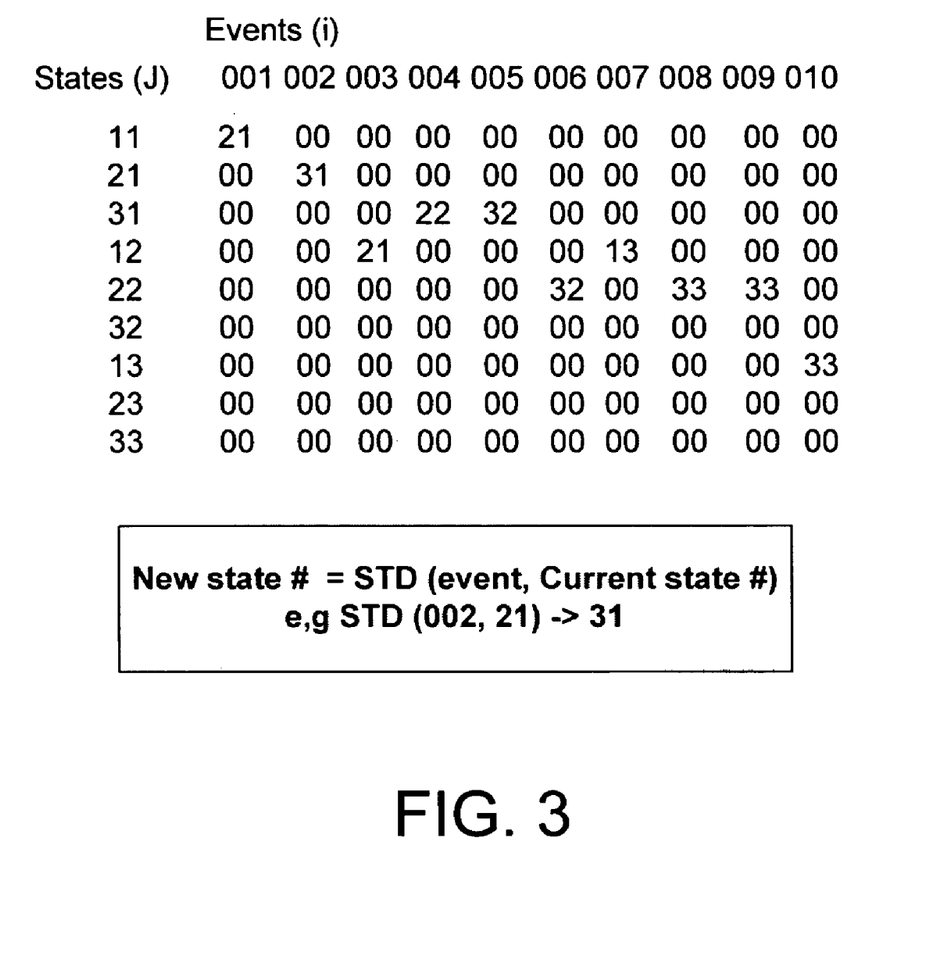
FIG. 3 is a diagram illustrating a state and event table in accordance with an embodiment of the invention.

FIG. 3 illustrates a sample state and event table 230 that is implemented as a state machine to process a call within the IVR unit 200 during the intermediate self-service call processing phase. States (J) are shown along a y-axis and Events (i) are shown along an x-axis. Based on any current state, the occurrence of an event creates a new state. For example, in the illustrated table, if a current state is "22" and an event "06" occurs, the new state becomes "32".

Figure 4:
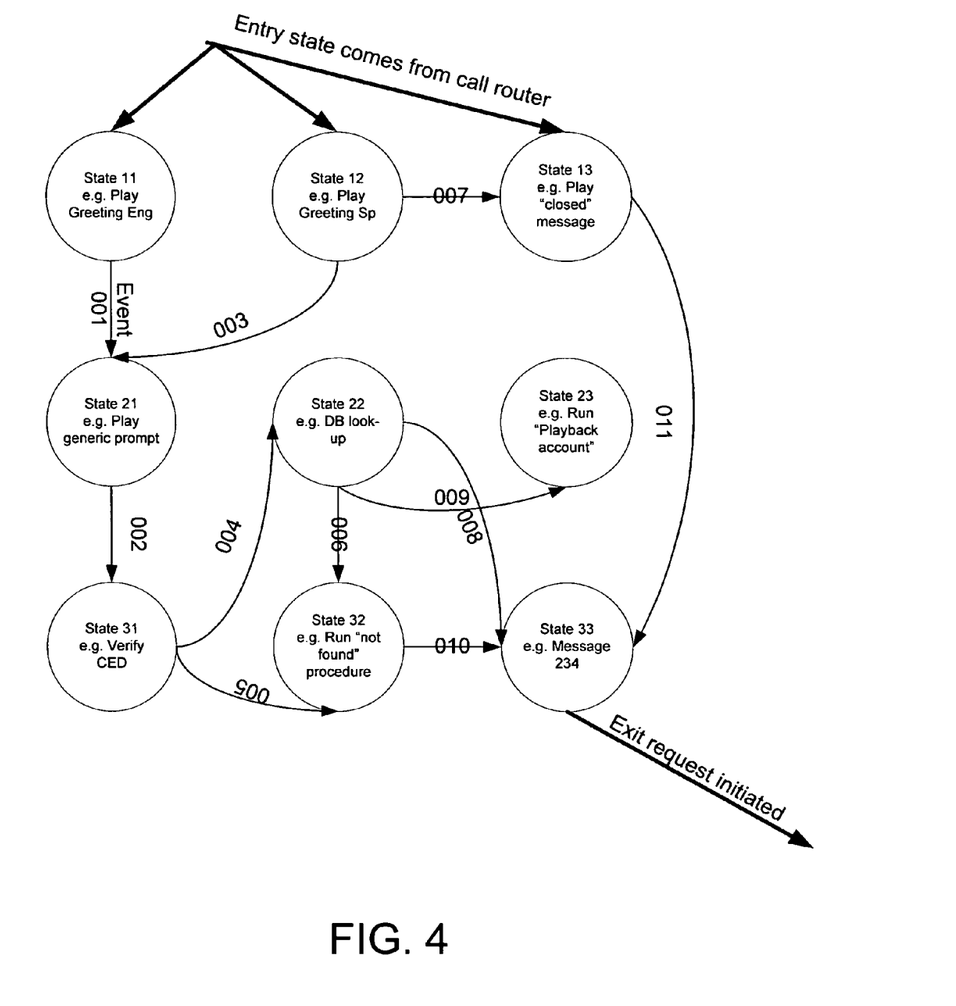
FIG. 4 is a diagram illustrating processing within an IVR unit using the state and event table.

FIG. 4 illustrates navigation of the state and event table of FIG. 3. Initially, the IVR unit 200 receives an entry state from the call router. If the IVR unit 200 receives entry state 11, the IVR unit 200 implements its applications 250 to play an English greeting. If the next event is "001", by navigating the table of FIG. 3, the IVR unit 200 determines that a state of "11" and an event "001" result in new state "21". As shown in FIG. 4, the new state "21" may dictate the playing of a generic prompt. The prompt may request that a user enter data referred to as caller entered data (CED). If the user enters the CED, event "002" has occurred and a new state "31 results. In state "31", the IVR unit 200 uses its applications 250 to verify the CED information.

In the example of FIG. 4, if the IVR unit 200 is able to verify the CED information, event "004" occurs and state "22" is reached. State "22" includes database lookup for information connected to the CED. If the IVR unit 200 is unable to verify the CED information, event "005" occurs and state "32" is reached. Accordingly, the IVR unit 200 runs a "not found" procedure.

From state "22", any one of events "006", "008", or "009" might occur. Ultimately, from either state "22" or state "32", the call may reach state "33". From state "33", an exit request may be initiated. The IVR unit 200 passes the exit request to the call router 300 and the call router 300 handles the exit conditions of the call using its business rules 310.

Figure 5:
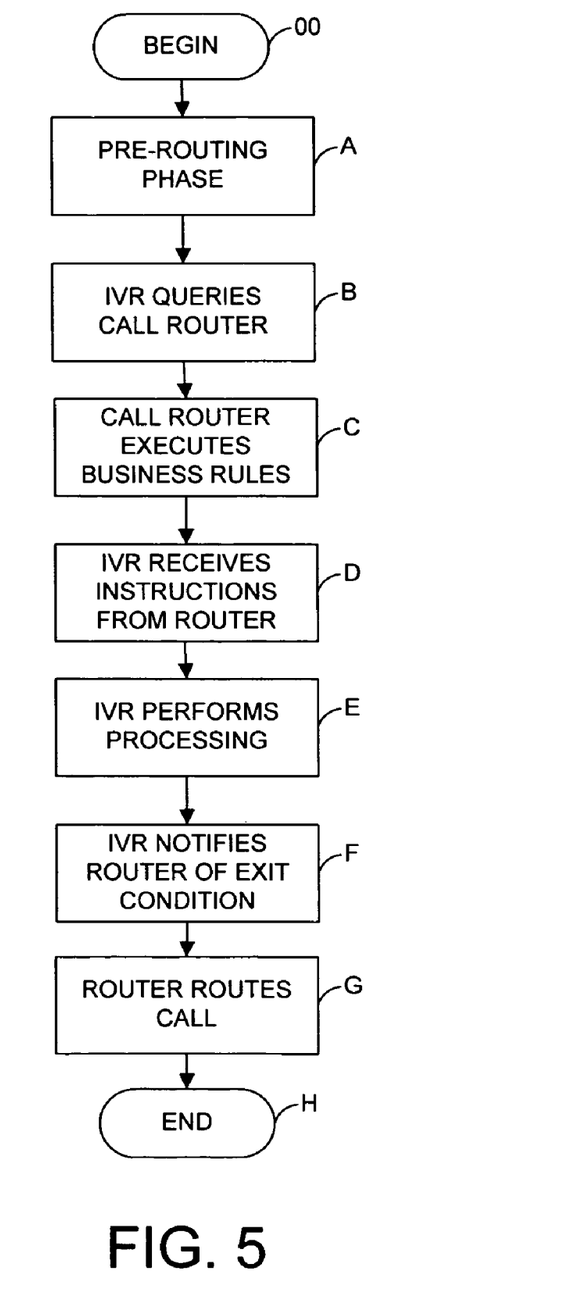
FIG. 5 is a flow chart illustrating a call processing method in accordance with an embodiment of the invention.

FIG. 5 is a flow chart illustrating a method for call routing in accordance with an embodiment of the invention. The process begins in step 00. Generally speaking, call arrival procedures are represented in steps A, B, C, and D. Intermediate processing occurs in steps E and F. Call departure procedures are reflected by step G.

The incoming call enters a pre-routing phase in step A. The IVR unit 200 may blindly accept any application number from the call router 300 and will try to locate the application 250 in the application list 240. If the IVR unit 200 finds the application, it will proceed and run the application. Otherwise the IVR unit 200 will initiate a default procedure.

In step B, after the IVR unit 200 collects identifying data and requests, the IVR unit 200 queries the call router 300 to obtain suggested treatment based on caller data. In step C, the call router 300 executes business rules 310 in response to the query. The call router 300 returns another application number to the IVR. Because the call has already been identified, no correlation key is necessary.

In step D, the IVR unit 200 receives instructions, such as an entry state, from the call router 300. In step E, the IVR unit 200 performs processing as described above with respect to FIGS. 3 and 4. In step F, the IVR unit 200 notifies the call router 300 that an exit condition exists. The IVR unit 200 will communicate caller real time data and IVR exit conditions as defined by the states used by the call router 300 with the route request. In step G, the router routes the call to an alternate IVR, CSR, or other resource or ends the call as appropriate. The call router 300 will define a new call destination in terms of site and agent group and will define a virtual private network (VPN) number leading to the selected destination. The call router 300 returns the VPN number to the IVR unit 200 as an out-dialing combination. The IVR unit will out-dial whatever combination it receives from the call router as long as the format is correct and the call will be removed from the IVR trunks by the voice network. If the call setup procedure is unsuccessful because of an incorrect out-dialing combination, the IVR unit 200 will use a default out-dialing combination that is hard-coded or stored in the initialization file 280. The IVR unit 200 will report call departure back to the call router 300. After clean-up activities, the IVR unit 200 will be ready to process the next call using the same port. Call processing ends in step H.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for processing an incoming call, the system comprising:

a call router for providing external application flow control for an interactive voice response unit, the call router including rules for handling call arrival and call departure, wherein the rules for handling call arrival include rules for pre-routing a call to the interactive voice response unit based on available call parameters by issuing a call notification to the interactive voice response unit, wherein the call notification includes an application number, and wherein the rules for handling call arrival further include rules for responding to a query from the interactive voice response unit to provide a suggested treatment based on caller data collected by the interactive voice response unit, and wherein the rules for handling call departure comprise rules for determining a call destination based on an exit condition from the interactive voice response unit; and the interactive voice response unit for processing calls distributed by the call router comprising a state and event table for operation as a state machine for intermediate processing between call arrival and call departure, wherein the interactive voice response unit is configured to run an application based on the application number in the call notification to collect caller data, to query the call router to obtain the suggested treatment based on the caller data, and to determine the exit condition based on the suggested treatment using the state and event table.

2. The system of claim 1, further comprising an external resource for updating the state and event table in order to control interactive voice response application flow.

3. The system of claim 2, wherein the external resource comprises a dialed number identification service resource.

4. The system of claim 2, wherein the external resource comprises an update key for indicating an update status for the state and event table.

5. The system of claim 1, wherein the interactive voice response unit comprises a call event interface and a call routing interface for receiving incoming call information from the call router.

6. The system of claim 5, wherein the interactive voice response unit comprises an application list and a set of applications referenced by the list, wherein the routing interface receives an application number from the call router.

7. The system of claim 1, wherein the state and event table defines a new state based on a current state and a current event.

8. The system of claim 7, wherein the interactive voice response unit continues processing if the new state is not an exit state.

9. The system of claim 7, wherein the interactive voice response unit returns control to the call router if the new state is an exit state.

10. The system of claim 1, wherein the interactive voice response unit comprises an initialization file containing information for initiating default procedures if the call router fails.

11. A method for processing an incoming call using an interactive voice response unit and a call router providing external application flow control for the interactive voice response unit, the method comprising:
    initially treating a call with arrival procedures at a call router, including pre-routing a call to an interactive voice response unit based on available call parameters by issuing a call notification to the interactive voice response unit, wherein the call notification includes an application number;
    receiving the call notification at the interactive voice response unit and running an application based on the application number in the call notification to collect caller data;
    querying the call router to obtain a suggested treatment based on the caller data;
    receiving the suggested treatment from the call router and processing the call using a state and event table in the interactive voice response unit to determine an exit condition;
    performing call departure procedures at the call router upon receiving the exit condition from the interactive voice response unit, including defining a call destination based on the exit condition; and
    routing the call to the call destination.

12. The method of claim 11, further comprising initializing the state and event table with information contained in an external resource.

13. The method of claim 11, wherein receiving a suggested treatment from the call router comprises receiving an entry state determined based on the caller data.

14. The method of claim 13, further comprising performing intermediate processing at the interactive voice response unit based on the received entry state.

15. The method of claim 11, wherein processing the call comprises defining a new state based on a current event and a current state.

16. The method of claim 15, wherein processing the call further comprises defining an exit state as the new state, the exit state corresponding with the exit condition.

17. The method of claim 11, further comprising accessing an external dialed number identification service resource from the interactive voice response unit.

18. The method of claim 11, further comprising accessing an interactive voice response initialization file to obtain default information if transmitted call router information is insufficient.

19. An interactive voice response unit for processing a call after call arrival at a call router, the call router providing external application flow control for the interactive voice response unit, the interactive voice response unit comprising:
    a call routing interface and a call event interface for receiving information or instructions from the call router and for notifying the call router about call state changes;
    a set of interactive voice response applications and an application list for locating an application; and
    a state and event table for processing the received information in order to determine a new state from a current event and a current state; and
    wherein the interactive voice response unit is configured to:
        receive a call notification from the call router, the call notification including an application number,
        run an application from the set of interactive voice response applications based on the application number to collect caller data,
        query the call router to obtain a suggested treatment based on the caller data,
        process the call using the state and event table to determine an exit condition, and
        communicate the exit condition to the call router, wherein the caller router performs call departure procedures based on the exit condition.

20. The interactive voice response unit of claim 19, further comprising an initialization file for accessing an external resource for updating the state and event table.

21. The interactive voice response unit of claim 19, wherein the state and event table comprises a mechanism for determining an exit state and for returning control to the call router for implementing departure procedures.

22. A method for intermediate processing of an incoming call at an interactive voice response unit after call arrival at a call router providing external application flow control for the interactive voice response unit, the method comprising:
    receiving a call notification from the call router at an interactive voice response unit call routing interface and call event interface, the call notification including call information and an application number;
    running an interactive voice response application based on the application number to collect caller data;
    querying the call router to obtain a suggested treatment for the call based on the caller data; and
    receiving the suggested treatment and implementing a state and event table stored in the interactive voice response unit as a state machine to determine a new state based on a current state and a current event.

23. The method of claim 22, further comprising initializing the state and event table with information contained in an external resource.

24. The method of claim 22, wherein receiving the suggested treatment comprises receiving an entry state from the call router.

25. The method of claim 24, further comprising performing intermediate processing at the interactive voice response unit based on the received entry state.

26. The method of claim 25, wherein performing intermediate processing comprises defining an exit state as the new state.

27. The method of claim 26, further comprising transferring control to the call router upon defining the exit state.

28. The method of claim 22, further comprising accessing an interactive voice response initialization file to obtain default information if transmitted call router information is insufficient.

* * * * *